United States Patent Office 2,996,457

Patented Aug. 15, 1961

2,996,457

FERROMAGNETIC COMPLEX OXIDES OF MANGANESE WITH BOTH COBALT AND NICKEL IN THE CRYSTAL LATTICE AND HAVING THE ILMENITE-TYPE CRYSTAL STRUCTURE

Thomas J. Swoboda, Wilmington, Del., assignor to E. I. du Pont de Nemours and Company, Wilmington, Del., a corporation of Delaware No Drawing. Filed June 15, 1956, Ser. No. 591,532
10 Claims. (Cl. 252—62.5)

This invention relates to new ferromagnetic crystalline compounds and more particularly to new ferromagnetic crystalline oxides of manganese and to their preparation.

Ferromagnetic materials are very useful in a variety of applications. In particular they are useful as the magnetic coating of recording tapes and as magnetic core materials. In some of these applications, especially those requiring magnetic materials of low loss characteristics at high frequencies, or of relatively high coercive force, ferromagnetic oxides are normally more useful than ferromagnetic metals. In view of the extremely small number of known ferromagnetic oxides, it is desirable to discover new oxides of this type. In particular, it is desirable to provide new ferromagnetic oxides having particular combinations of magnetic properties, viz., particular combinations of Curie temperature, saturation induction, remanent induction, intrinsic coercive force, and low loss characteristics.

In the U.S. patent application of Richard C. Toole, Serial No. 452,449, filed August 26, 1954, now Patent No. 2,770,523, issued Nov. 13, 1956, there is described and claimed the ferromagnetic crystalline form of nickel manganese oxide, $NiMnO_3$, and of cobalt manganese oxide, $CoMnO_3$, having the ilmenite-type crystal structure. However, no ferromagnetic complex oxides of managanese containing both cobalt and nickel in the crystal lattice have heretofore been described.

It is an object of this invention to provide new ferromagnetic crystalline compounds. A further object is to provide new ferromagnetic crystalline oxides of manganese, cobalt and nickel of the ilmenite-type crystal structure and methods for their preparation. A still further object is to provide new ferromagnetic crystalline complex oxides of manganese and cobalt in which a portion of the cobalt in the crystal lattice is substituted by nickel. Another object is to provide new ferromagnetic crystalline complex oxides of manganese, cobalt and nickel of the ilmenite-type crystal structure having improved magnetic properties such as high coercive force and improved combinations of properties, the latter obtainable by reason of the adjustability of the chemical composition. Other objects will appear hereinafter.

These and other objects of this invention are accomplished by providing a new class of crystalline complex oxides of manganese, cobalt and nickel characterized by having the ilmenite-type crystal structure and by being ferromagnetic. The crystal form of these ferromagnetic complex oxides of manganese containing both cobalt and nickel are of the ilmenite-type crystal structure with cell parameters $a_0$ ranging between 4.906 and 4.932 and $c_0$ ranging between 13.59 and 13.70. The Curie temperatures of these new ferromagnetic complex oxides of manganese, cobalt and nickel are greater than 118° C. but less than 164° C. These novel complex oxides of manganese, cobalt and nickel are characterized by chemical composition, by their ilmenite-type crystal structure and by their ferromagnetic properties and Curie temperature. The chemical composition of these new compounds is represented by the formula $$Co_XNi_{(1-x)}MnO_3$$

where $x$ is between 0.01 and 0.99.

The new ferromagnetic complex oxides of this invention are homogeneous crystalline products in which nickel is substituted in the crystal lattice for a portion of the cobalt in the ilmenite-type cobalt manganese oxide. The ilmenite-type crystal structure is not destroyed by this substitution and the molar ratio of ferrous group metal, i.e., the sum of cobalt and nickel to manganese and to oxygen is maintained substantially constant. This behavior of the cobalt and nickel in these complex mixed oxides is unpredictable in view of the inability of many other oxides to form mixed oxides without changing their crystal structure or losing their ferromagnetic properties. Furthermore, since the ratio of cobalt to nickel in the complex oxides of this invention can be varied widely without changing the ilmenite structure, it is possible to provide oxides of specific composition possessing especially valuable combinations of magnetic properties. For example, by selection of the ratio of cobalt to nickel in the oxides of this invention, it is possible to provide ferromagnetic oxides having the desirable combination of high intrinsic coercive force and high temperature stability by virtue of the high Curie temperatures exhibited by these mixed oxides.

The crystal structure of the products of this invention is of the ilmenite-type. By this term is meant that the products have the same type of crystal structure as ilmenite, $FeTiO_3$. This crystal structure is defined in Wyckoff's "Crystal Structures," Interscience Publishers (1951), chapter V, *a*–5. The structure of a specific example of the ilmenite-type crystal is uniquely distinguished by values of the two cell parameters, $a_0$ and $c_0$.

The terms Curie temperature, saturation induction, and intrinsic coercive force used herein are in their commonly accepted meanings. Thus, Curie temperature refers to the temperature above which the spontaneous magnetic moment of the material vanishes. Other magnetic properties used to characterize the products of this invention are the intrinsic coercive force, $H_{ci}$, and the saturation induction, $B_s$. Definitions of these magnetic terms and the symbols used herein are given in Special Technical Publication No. 85 of the American Society for Testing Materials entitled "Symposium on Magnetic Testing" (1948), pages 191–198. The values of $H_{ci}$ and $B_s$ given herein are determined on a D.C. ballistic-type apparatus which is a modified form of the apparatus described by Davis and Hartenheim in the Review of Scientific Instruments 7, 147 (1936).

A definite advantage of the mixed oxides of this invention over the nickel manganese oxide and cobalt manganese oxide of said patent application of Toole, Ser. No. 452,449, now Patent No. 2,770,523, issued November 13, 1956, is their flexibility. The variability of their chemical composition permits adjustment of specific magnetic properties or combinations of magnetic properties to best fit the requirements of individual practical applications.

The ferromagnetic oxides of this invention are prepared by heating a mixture of manganese dioxide, $MnO_2$, black nickel oxide, NiO, and cobaltous-cobaltic oxide, $Co_3O_4$, to a temperature of at least 500° C. under a pressure of at least 500 atmospheres.

The process of this invention is carried out in a corrosion-resistant container, i.e., a container constructed of a material which is inert to the reactants under the reaction conditions, e.g., platinum. The container can be a completely sealed unit having flexible walls or it can be a vessel permitting transmission of the desired pressure to the reaction system, such as a cylindrical tube closed at one end but equipped at the other end with a closely fitting piston.

The container is charged with a mixture of manganese dioxide, nickel oxide, and cobaltous-cobaltic oxide in the desired proportions. The mole ratios of the three oxide reactants can be varied over wide limits. It is essential that the manganese dioxide amount to between 15 and 85 mole percent of the total oxide mixture. (The mole percent is calculated using the molecular weights of nickel oxide and manganese dioxide and one-third the molecular weight of cobaltous-cobaltic oxide. This applies here and in all subsequent use of the term mole percent.) The amount of manganese dioxide used strongly influences the yield of the magnetic phase obtained. The preferred range is between 50 and 70 mole percent of manganese dioxide. The proportions of the cobaltous-cobaltic oxide and nickel oxide can vary widely, amounts of either nickel oxide or cobaltous-cobaltic oxide as low as 0.1 mole percent being operable.

The closed reaction vessel is then heated to a temperature of 500° to 800° C. and preferably at 550°–700° C., under a pressure of at least 500 atmospheres, preferably at least 1000 atmospheres and more preferably at 2000–5000 atmospheres. Even higher pressures can be used if the equipment is capable of withstanding such pressures. The duration of the heating period is not critical. Times ranging from 1 to 3 hours are satisfactory under the above-specified conditions of temperature and pressure.

After the reaction is completed, the reaction vessel is cooled back to room temperature and the resulting oxide reaction product is separated from the aqueous medium, if one is used, by filtration and is then washed and dried. The reaction product contains, in addition to the magnetic phase, residues of some or all of the three oxide reactants in amounts which vary with the reaction conditions employed. If desired, the crude reaction product can be purified by successive treatments with cold concentrated hydrochloric acid and hot concentrated nitric acid to remove, in particular, unreacted $MnO_2$ and NiO, which are preferentially soluble in these acids. The non-magnetic reactants can also be separated from the ferromagnetic phase by magnetic means, particularly in conjunction with the acid treatments which improve the results obtained from the separations.

The chemical composition and physical properties of the magnetic phase obtained under a given set of operating conditions are controlled to a great extent by the proportions of cobaltous-cobaltic oxide and nickel oxide in the reaction mixture. However, other factors such as the temperature and the nature of the reaction medium employed also influence the composition and properties of the magnetic phase. For example, higher Curie temperatures are obtained when water is used as reaction medium instead of 5% sulfuric acid. The magnetic phase is a homogeneous crystalline complex oxide of manganese with both cobalt and nickel having the ilmenite-type crystal structure and a definite Curie temperature by which it is characterized.

The Curie temperature curves of the $Co_xNi_{1-x}MnO_3$ compounds of this invention always show a single Curie temperature. This differentiates the products of this invention from intimately blended physical mixtures of cobalt manganese oxide and nickel manganese oxide which give Curie temperature curves from which the two Curie temperatures of the individual phases can be clearly and accurately read. Furthermore, the X-ray diffraction pattern of the $Co_xNi_{1-x}MnO_3$ compounds of this invention show that they are definite compounds and not a mere mixture of $CoMnO_3$ and $NiMnO_3$.

The synthesis can be carried out with a dry mixture of the three oxide reactants. However, it is preferable to use an aqueous medium, for example, aqueous solutions of inorganic acids or of bases such as alkali metal hydroxides. Aqueous solutions of inorganic acids such as sulfuric and hydrochloric acids having concentrations ranging from 1% to 70% or more are satisfactory. Likewise, aqueous solutions of sodium, lithium, and potassium hydroxides ranging from 1% to 25% are satisfactory reaction media.

The amount of aqueous medium employed can vary widely, amounts ranging from 0.1 to 4 times the weight of the oxide mixture being useful. Preferably an amount of aqueous medium ranging from 0.2 to 0.7 of the weight of the oxide reactants is employed.

The grades of manganese dioxide, black nickel oxide, and cobaltous-cobaltic oxide available commercially are satisfactory for use in the process of this invention.

The products and process of this invention are illustrated further by the following examples in which the proportions of ingredients are expressed in parts by weight unless otherwise specified.

EXAMPLE I

A flexible platinum tube sealed at one end is charged with 3.87 parts of finely divided cobaltous-cobaltic oxide, $Co_3O_4$, 0.90 part of black nickel oxide, NiO, 5.23 parts of manganese dioxide, $MnO_2$, and 1 part of 5% aqueous sulfuric acid. The open end of the charged tube is closed by sealing with a torch and the tube is then placed in a water-filled steel bomb which is heated and pressured with water to 700° C. and 3000 atmospheres. After holding at these operating conditions for three hours, the apparatus is cooled, then disassembled and the solid reaction product in the platinum tube is isolated by filtration, washing with water, and drying. There is isolated 9.68 parts of a gray-black, finely divided, crystalline magnetic solid. The Curie temperature of this product is 125° C.

Five parts of the crude reaction product is ground into a fine powder which is then dispersed in water. The ferromagnetic portion of the reaction mixture is extracted by means of a permanent magnet, 4.83 parts of a gray magnetic fraction being obtained. This magnetic fraction is immersed in 400 parts of cold concentrated hydrochloric acid for 75 minutes. The magnetic residue is isolated by decantation, filtration, washing, and drying. Four and five-tenths parts of purified product is obtained. This product exhibits an X-ray diffraction pattern having the reflection lines listed in the following table. In this and other tables in the examples the column headed "*d*" gives the interplanar spacing in Angstrom units and the column headed "I" gives the relative reflection intensities based on a value of 10 for the strongest reflection.

| d | I | d | I |
|---|---|---|---|
| 3.627 | 4.5 | 1.589 | 0.5 |
| 2.669 | 10 | 1.571 | 0.5 |
| 2.465 | 6.5 | 1.459 | 2.5 |
| 2.304 | 0.5 | 1.423 | 2.5 |
| 2.285 | 0.5 | 1.389 | <0.5 |
| 2.168 | 2 | 1.303 | 1.5 |
| 1.810 | 3 | 1.294 | 1.0 |
| 1.673 | 5 | | |

The above X-ray diffraction pattern is that of an ilmenite-type crystalline phase. The cell constants of the ilmenite-type phase calculated from the above diffraction pattern are $a_0=4.931$ A. and $c_0=13.68$ A.

Chemical analysis of the purified product shows the following composition: Co, 27.83%; Ni, 8.65%; Mn, 33.63%; O, 29.89% (by difference). Calculations show these results to correspond to the formula $$Co_{0.76}Ni_{0.23}Mn_{0.98}O_3$$

The magnetic properties of this cobalt-nickel manganese oxide are as follows:

Intrinsic coercive force, $H_{ci}$------------oersteds-- 655
Saturation induction, $B_s$----------------gausses-- 1130

EXAMPLE II

A flexible platinum tube is charged with 2.90 parts of cobaltous-cobaltic oxide, 1.79 parts of black nickel oxide, 7.32 parts of manganese dioxide, and 1.50 parts of 5% aqueous sulfuric acid, and the reaction tube is sealed and heated in a water-filled pressure vessel, as described in Example I, at a temperature of 700° C. and 3000 atmospheres pressure for three hours. There is isolated from the reaction vessel by filtration, washing, and drying 11.50 parts of a gray-black, finely divided, crystalline-appearing magnetic solid. This product has a Curie temperature of 138° C.

The crude reaction product is placed on a fritted glass funnel and, with the aid of a vacuum, is washed with 650 parts of cold concentrated hydrochloric acid over a period of 2½ hours. After washing the residue with water and drying, there is obtained 7.44 parts of a magnetic residue. This residue is suspended in water and then placed in a magnetic field. There is isolated 6.41 parts of a magnetic fraction. A portion (6.06 parts) of this magnetic fraction is immersed in 457 parts of cold concentrated hydrochloric acid for two hours. After filtering, washing, and drying the residue, there is obtained 2.32 parts of a magnetic residue. This product exhibits the following X-ray diffraction pattern:

| d | I | d | I |
|---|---|---|---|
| 3.622 | 5 | 1.587 | 0.5 |
| 2.669 | 10 | 1.569 | 0.5 |
| 2.464 | 10 | 1.458 | 2.5 |
| 2.304 | 0.5 | 1.421 | 3 |
| 2.281 | 1 | 1.388 | <0.5 |
| 2.166 | 2 | 1.302 | 1.5 |
| 1.809 | 2.5 | 1.293 | 0.5 |
| 1.672 | 4.5 | | |

This is the pattern of an ilmenite-type crystalline phase, and the cell constants calculated from these diffraction spacings are $a_0$=4.926 A. and $c_0$=13.67 A.

The purified product has the following chemical analysis: Co, 22.39%; Ni, 13.18%; Mn, 34.35%; O, 30.08% (by difference). The formula of the product calculated from these analytical results is $Co_{0.61}Ni_{0.36}Mn_{1.00}O_3$.

The magnetic properties of the cobalt-nickel manganese oxide are as follows:

Intrinsic coercive force, $H_{ci}$------------oersteds-- 940
Saturation induction, $B_s$----------------gausses-- 500

EXAMPLE III

A flexible platinum tube is charged with 0.89 part of cobaltous-cobaltic oxide, 3.03 parts of black nickel oxide, 6.09 parts of manganese dioxide, and 1.00 part of 5% aqueous sulfuric acid, and the tube is sealed, then heated at 700° C. under 3000 atmospheres pressure for three hours, as described in Example I. The crude reaction product is isolated by filtration, washing, and drying, and there is obtained 9.67 parts of a greenish-brown to gray, finely divided magnetic solid. The Curie temperature of this product is 158° C.

Five parts of the above product is dispersed in water and magnetically separated, and there is recovered 3.89 parts of a gray magnetic fraction. This fraction is immersed in 475 parts of cold concentrated hydrochloric acid for 100 minutes and is then filtered, washed, and dried. There is recovered 2.60 parts of a magnetic residue. This residue is again immersed in 475 parts of cold concentrated hydrochloric acid for 135 minutes and, after filtration, washing, and drying, there is recovered 1.38 parts of a magnetic residue. This magnetic residue exhibits the following X-ray diffraction pattern:

| d | I | d | I |
|---|---|---|---|
| 3.603 | 5.5 | 1.577 | 0.5 |
| 2.654 | 10 | 1.562 | 0.5 |
| 2.453 | 8 | 1.452 | 2.5 |
| 2.292 | 0.5 | 1.416 | 3 |
| 2.266 | 0.5 | 1.382 | <0.5 |
| 2.157 | 2.5 | 1.294 | 1.5 |
| 1.801 | 3 | 1.286 | 0.5 |
| 1.664 | 5 | | |

This is the pattern of an ilmenite-type crystalline phase. The cell constants calculated from these diffraction lines are as follows: $a_0$=4.907 A. and $c_0$=13.59 A.

Chemical analysis shows the purified product to have the following composition: Co, 5.54%; Ni, 33.17%; Mn, 31.42%; O, 29.87% (by difference). The formula of the mixed cobalt-nickel manganese oxide calculated from these analytical data is $Co_{0.15}Ni_{0.91}Mn_{0.92}O_3$ The magnetic properties of this cobalt-nickel manganese oxide are as follows:

Intrinsic coercive force, $H_{ci}$-----------oersteds-- 352
Saturation induction, $B_s$----------------gausses-- 1520

EXAMPLE IV

A mixture of 0.49 part of cobaltous-cobaltic oxide, 0.23 part of black nickel oxide, 0.80 part of manganese dioxide, and 0.45 part of 5% aqueous sodium hydroxide is heated in a sealed platinum tube at 700° C. under 3000 atmospheres pressure for three hours, as described in the preceding examples. There is obtained by filtration, washing, and drying of the crude reaction mixture a black, finely divided magnetic solid having a Curie temperature of 151–156° C. The X-ray diffraction pattern obtained on this crude product shows that the major component is an ilmenite-type crystalline cobalt-nickel manganese oxide. Interplanar spacings corresponding to the ilmenite-type pattern were found as follows:

| d | I | d | I |
|---|---|---|---|
| 3.626 | 6 | 1.581 | 3 |
| 2.664 | 10 | 1.454 | 6 |
| 2.463 | 10 | 1.418 | 5 |
| 2.300 | 0.5 | 1.299 | 2 |
| 2.275 | 1 | 1.291 | 0.5 |
| 2.165 | 4 | 1.229 | 2 |
| 1.807 | 5 | 1.202 | 1 |
| 1.670 | 7 | 1.191 | 0.5 |

Other weaker lines present indicated the presence of $Co_3O_4$ and its modification $(Mn,Co)_3O_4$, both of which are spinel types. The ferromagnetic ilmenite-type crystalline cobalt-nickel manganese oxide can be separated from the non-magnetic reactants and the non-magnetic spinel type products in accordance with the procedures illustrated in the preceding examples.

EXAMPLE V

A mixture of 0.89 part of cobaltous-cobaltic oxide, 0.36 part of black nickel oxide, 2.75 parts of manganese dioxide, and 0.40 part of water is sealed in a platinum tube and heated at 700° C. under 3000 atmospheres pressure for three hours as described in the preceding examples. There is recovered by filtration, washing, and drying 3.85 parts of a dark gray, highly crystalline, magnetic solid cobalt-nickel manganese oxide. The Curie temperature of this product is 130° C.

EXAMPLE VI

A mixture of 0.79 part of cobaltous-cobaltic oxide, 0.49 part of black nickel oxide, 1.98 parts of manganese dioxide, and 0.98 part of 5% aqueous hydrochloric acid is heated in a platinum tube in the manner described in the preceding examples at 700° C. and 3000 atmospheres pressure for three hours. There is obtained by filtration, washing, and drying of the crude reaction mixture 3.15 parts of gray magnetic powder. This cobalt-nickel manganese oxide has a Curie temperature of 127° C.

EXAMPLE VII

A mixture of 0.38 part of cobaltous-cobaltic oxide, 0.84 part of black nickel oxide, 2.78 parts of manganese dioxide, and 0.40 part of 5% sulfuric acid is heated in a sealed platinum tube, as described in the preceding examples, at 625° C. and 1000 atmospheres pressure for three hours. There is recovered from the crude reaction mixture by filtering, washing, and drying 3.91 parts of dark gray, crystalline-appearing magnetic cobalt-nickel manganese oxide. This product has a Curie temperature of 146° C.

EXAMPLE VIII

A mixture of 0.38 part of cobaltous-cobaltic oxide, 0.84 part of black nickel oxide, 2.78 parts of manganese dioxide, and 0.40 part of 5% aqueous sulfuric acid is heated in a sealed platinum tube by the procedure described in the previous examples at 500° C. and 3000 atmospheres for three hours. There is recovered from the crude reaction mixture by filtration, washing, and drying 3.98 parts of gray-block, finely divided, magnetic cobalt-nickel manganese oxide. This product has a Curie temperature of 156° C.

Cobalt-nickel manganese oxides of still higher coercive force can be obtained by cold-working the oxides obtained by the process of this invention. The cold-working step can be carried out as follows. The oxide powder is run in a thin stream through the rolls of a rubber mill, e.g., 5–15 g. samples passed through rolls of a 6″, 5 H.P. mill with gap set at less than 1 mil. This is repeated until the product is worked to glassy-appearing flake-like aggregates. This may require 10–30 passes through the mill with intervening scraping of the rolls to free adhering oxide. The product can then be ground back to a powder state, e.g., in a mortar.

A portion of the product of Example III, having a coercive force of 352 oersteds cold-worked in the manner just described has a coercive force, $H_{ci}$, of 1700 oersteds.

The ferromagnetic cobalt-nickel manganese oxides of this invention are useful in a variety of applications. For example, they are valuable in magnetic coatings for magnetic recording tapes, drums, and records. They can be used in the manufacture of permanent magnets or of magnetic cores, e.g., in low-loss transformer cores for megacycle second frequency ranges. they are also useful in microwave attenuators, in gyrator elements, in electrically operated high frequency switches, in focusing magnets, and in magnetic clutches.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A complex oxide of manganese with both cobalt and nickel in the crystal lattice corresponding to the mormula $Co_xNi_{(1-x)}MnO_3$ wherein $x$ is between 0.01 and 0.99, characterized by having a definite single Curie temperature within the range of 125° C. to 158° C., having a crystal structure of the ilmenite-type, and by being ferromagnetic.

2. A complex oxide of manganese with both cobalt and nickel in the crystal lattice corresponding to the formula $Co_xNi_{(1-x)}MnO_3$ wherein $x$ is within the range of 0.15 and 0.76, characterized by having a definite single Curie temperature within the range of 125° C. to 158° C., a crystal structure of the ilmenite-type with cell parameters of $a_0$ ranging between 4.906 and 4.932 A. and of $c_0$ ranging between 13.59 and 13.70 A. and by being ferromagnetic.

3. A complex oxide of manganese with both cobalt and nickel in the crystal lattice as set forth in claim 2 wherein said complex oxide exhibits an intrinsic coercive force of at least 352 oersteds.

4. As a new ferromagnetic material, a complex oxide of manganese with both cobalt and nickel in the crystal lattice as set forth in claim 2 wherein said ferromagnetic material after cold-working exhibits an intrinsic coercive force of at least 1700 oersteds.

5. Process for preparing a ferromagnetic crystalline complex oxide of manganese, cobalt and nickel which comprises heating, at a temperature of 500 to 800° C. and under a pressure of at least 500 atms., a mixture of manganese dioxide, nickel oxide and cobaltous cobaltic oxide in which the manganese dioxide is between 15 and 85 mole percent of the total oxide mixture and in which the nickel oxide and the cobaltous cobaltic oxide each is at least 0.1 mole percent of the total oxide mixture, and separating as the resulting product a crystalline complex oxide of manganese with both cobalt and nickel in the crystal lattice corresponding to the formula $$Co_xNi_{(1-x)}MnO_3$$

wherein $x$ is between 0.01 and 0.99, characterized by having a definite single Curie temperature within the range of 125° C. to 158° C., having a crystal structure of the ilmenite-type, and by being ferromagnetic.

6. Process for preparing a ferromagnetic crystalline complex oxide of manganese, cobalt and nickel which comprises heating, at a temperature of 500 to 800° C. and under a pressure of 1000 to 5000 atms., in contact with an aqueous medium, a mixture of manganese dioxide, nickel oxide and cobaltous cobaltic oxide in which the manganese dioxide is between 15 and 85 mole percent of the total oxide mixture and in which the nickel oxide and the cobaltous cobaltic oxide each is at least 0.1 mole percent of the total oxide mixture, and separating as the resulting product a crystalline complex oxide of manganese with both cobalt and nickel in the crystal lattice corresponding to the formula $Co_xNi_{(1-x)}MnO_3$ wherein $x$ is between 0.01 and 0.99, characterized by having a definite single Curie temperature within the range of 125° C. to 158° C., having a crystal structure of the ilmenite-type, and by being ferromagnetic.

7. Process for preparing a ferromagnetic crystalline complex oxide of manganese, cobalt and nickel as set forth in claim 6 wherein said aqueous medium is a dilute aqueous solution of an inorganic acid.

8. Process for preparing a ferromagnetic crystalline complex oxide of manganese, cobalt and nickel as set forth in claim 6 wherein said aqueous medium is a dilute aqueous solution of an inorganic base.

9. Process for preparing a ferromagnetic crystalline complex oxide of manganese, cobalt and nickel as set forth in claim 6 wherein said mixture is heated at a temperature between 550 and 700° C. and under a pressure between 2000 and 5000 atms.

10. Process for preparing a ferromagnetic crystalline complex oxide of manganese, cobalt and nickel as set forth in claim 6 wherein the manganese dioxide in said mixture is between 50 and 70 mole percent of the total oxide mixture, and cold working the ferromagnetic crystalline complex oxide of manganese, cobalt and nickel thereby producing a ferromagnetic product of increased coercive force.

(References on following page)

References Cited in the file of this patent

UNITED STATES PATENTS

| | | |
|---|---|---|
| 1,997,193 | Kato et al. | Apr. 9, 1935 |
| 2,626,445 | Albers-Schoenberg | Jan. 27, 1953 |
| 2,770,523 | Toole | Nov. 13, 1956 |

FOREIGN PATENTS

| | | |
|---|---|---|
| 524,097 | Belgium | Nov. 30, 1953 |

OTHER REFERENCES

"Physica III," No. 6, June 1936, page 481.

J. of the Institute of Electrical Eng., Japan, November 1937, pp. 4 and 5; June 1939, p. 278.

Weil: Comptes Rendus, vol. 234, pp. 1351, 1352 (1952).

Bozorth et al., Physical Review, Sept. 15, 1955, p. 1792.